United States Patent
Lacolle et al.

(10) Patent No.: US 10,514,249 B2
(45) Date of Patent: *Dec. 24, 2019

(54) OPTICAL DISPLACEMENT SENSOR ELEMENT

(71) Applicant: SINTEF TTO AS, Trondheim (NO)

(72) Inventors: Matthieu Lacolle, Nesøya (NO); Ib-Rune Johansen, Oslo (NO); Thor Bakke, Lysaker (NO); Ole-Herman Bjor, Heggedal (NO)

(73) Assignee: Sintef TTO AS, Trondheim (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,143

(22) Filed: Dec. 10, 2018

(65) Prior Publication Data

US 2019/0107386 A1    Apr. 11, 2019

Related U.S. Application Data (63) Continuation of application No. 14/899,701, filed as application No. PCT/EP2014/063025 on Jun. 20, 2014, now Pat. No. 10,190,870.

(30) Foreign Application Priority Data

Jun. 21, 2013 (NO) .................................. 20130866
Jun. 26, 2013 (NO) .................................. 20130884

(51) Int. Cl.
  *G01B 11/14*    (2006.01)
  *H04R 23/00*    (2006.01)

(52) U.S. Cl.
  CPC ........... *G01B 11/14* (2013.01); *H04R 23/008* (2013.01)

(58) Field of Classification Search
  CPC ... G01L 9/0077; G01L 13/025; H04R 23/008; H04R 23/006; G01D 5/38; G01B 11/006;
  (Continued)

(56) References Cited

U.S. PATENT DOCUMENTS 4,636,076 A     1/1987  Pettigrew
4,979,827 A *  12/1990  Matsui ..................... G01D 5/38
                                                       250/237 G
(Continued)

FOREIGN PATENT DOCUMENTS

CN          1088312 A      6/1994
CN          1121590 A      5/1995
(Continued)

OTHER PUBLICATIONS

Norwegian Search Report issued in Norwegian Patent Application No. 20130884, 2 pages (dated Jan. 20, 2014).
(Continued)

*Primary Examiner* — Hoa Q Pham
(74) *Attorney, Agent, or Firm* — Rothwell, Figg, Ernst & Manbeck, P.C.

(57) ABSTRACT

The present invention relates to an optical displacement sensor comprising a first at least partially reflective surface and a second surface having a diffractive pattern, the surfaces being provided on elements having a variable distance between them, each surface pair defining a cavity between them. The sensor also comprising at least one light source transmitting light at least one a chosen wavelength range into said cavities and at least one light detector receiving light from the cavities, wherein said diffractive patterns are adapted to direct light toward at least one detector provided in a known position relative to said diffractive surfaces.

18 Claims, 6 Drawing Sheets

(58) Field of Classification Search
CPC ..... G01P 15/093; G01P 15/18; G02B 5/1828; G02B 26/0808
USPC .............................. 356/614–623; 250/237 G
See application file for complete search history.

(56) References Cited

U.S. PATENT DOCUMENTS

| | | | |
|---|---|---|---|
| 5,448,358 | A | 9/1995 | Ishizuka et al. |
| 5,920,418 | A | 7/1999 | Shiono et al. |
| 7,116,430 | B2 | 10/2006 | Degertekin et al. |
| 7,184,368 | B2 | 2/2007 | Johansen et al. |
| 7,272,976 | B2 | 9/2007 | Gajdeczko et al. |
| 7,355,720 | B1 | 4/2008 | Carr |
| 7,485,847 | B2 | 2/2009 | Degertekin et al. |
| 7,518,737 | B2 | 4/2009 | Hall et al. |
| 7,826,629 | B2 | 11/2010 | Miles et al. |
| 8,885,168 | B2 | 11/2014 | Olesen |
| 10,190,870 | B2 * | 1/2019 | Lacolle ................ H04R 23/008 |
| 10,197,589 | B2 * | 2/2019 | Johansen ............. G01P 15/093 |
| 2002/0163874 | A1 | 11/2002 | Nakanishi et al. |
| 2003/0067686 | A1 | 4/2003 | Shiono et al. |
| 2005/0018541 | A1 | 1/2005 | Johansen et al. |
| 2007/0165896 | A1 | 7/2007 | Miles et al. |
| 2008/0259750 | A1 | 10/2008 | Kadowaki et al. |
| 2009/0268211 | A1 | 10/2009 | Carr et al. |
| 2010/0225930 | A1 | 9/2010 | Maeno et al. |
| 2018/0075867 | A1 * | 3/2018 | Dahl ........................ G01S 3/80 |

FOREIGN PATENT DOCUMENTS

| | | |
|---|---|---|
| CN | 1388960 A | 1/2003 |
| CN | 1417597 A | 5/2003 |
| CN | 1485828 A | 3/2004 |
| EP | 0 132 978 A2 | 2/1985 |
| JP | S60-064215 A | 4/1985 |
| JP | 2010-210708 A | 9/2010 |
| WO | 03043377 A1 | 5/2003 |
| WO | 03046493 A1 | 6/2003 |

OTHER PUBLICATIONS

International Search Report issued in International Application No. PCT/EP2014/063025, 4 pages (dated Sep. 2, 2015).

Brown et al., "A Symmetric 3×3 Coupler Based Demodulator for Fiber Optic Interferometric Sensors," SPIE vol. 1584, Fiber Optic and Laser Sensors IX, pp. 328-335 (1991).

Hall et al., "Micromachined Optical Microphone Structures with Low Thermal-Mechanical Noise Levels," J. Acoust. Soc. Am. 122(4), Acoustical Society of America, pp. 2031-2037 (Oct. 2007).

Hall et al., "Micromachined Accelerometers With Optical Interferometric Read-Out and Integrated Electrostatic Actuation," Journal of Micromechanical Systems, vol. 17(1), pp. 37-44 (Feb. 2008).

Kuntzman et al., "Performance and Modeling of a Fully Packaged Micromechanical Optical Microphone," Journal of Micromechanical Systems, vol. 20(4), pp. 828-833 (Aug. 2011).

Office Action (and English language summary) with Search Report issued in Chinese Patent Application No. 201480034101.9, 9 pages (dated Jun. 20, 2017).

Dr. Johannes Heidenhain GmbH, "Exposed Linear Encoders" 68 pages (May 2013).

Japanese Office Action dated Mar. 19, 2018 issued in Japanese Patent Application No. 2016-520508. (15 pages).

* cited by examiner

-- Prior Art --

Fig. 1

-- Prior Art --

OPTICAL DISPLACEMENT SENSOR ELEMENT

CROSS REFERENCE TO RELATED APPLICATIONS

This application claims the benefit under 35 U.S.C. § 120 of the filing date of non-provisional patent application Ser. No. 14/899,701 filed Dec. 18, 2015, which is a 35 U.S.C. 371 National Phase Entry Application from PCT/EP2014/063025, filed Jun. 20, 2014, which claims the benefit of NO 20130884, filed on Jun. 26, 2013, and NO 20130866, filed on Jun. 21, 2013, the respective disclosures of which are incorporated herein in their entirety by reference.

FIELD OF THE DISCLOSURE

This invention relates to an optical displacement sensor element. An example may be a pressure sensor or a microphone, comprising two essentially flat surfaces being separated by a cavity being defined by a spacer, the distance between the surfaces being variable depending on pressure fluctuation in the environment relative to the pressure in the cavity. The change in distance between the surfaces may be caused by deflection of one or both of the surfaces, or by compressing the spacer.

BACKGROUND

Until recently displacement sensors such as microphones has been based on capacitor structures and impedance measurements. This has a number of disadvantages related to sensitivity, high voltage biasing, isolation between layers, alignment and positioning of membrane relatively to back electrode, high requirements to preamplifiers, and nonlinear response, all resulting in costly and complicated solutions.

Figure 1:
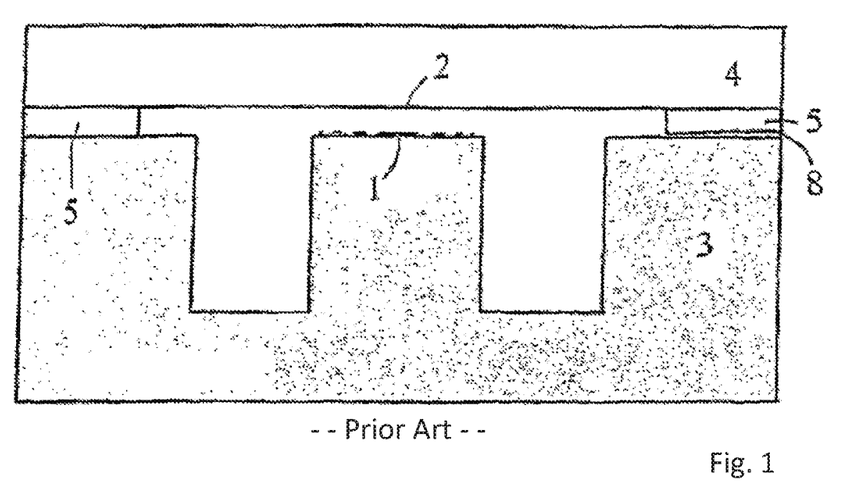
Figure 2:
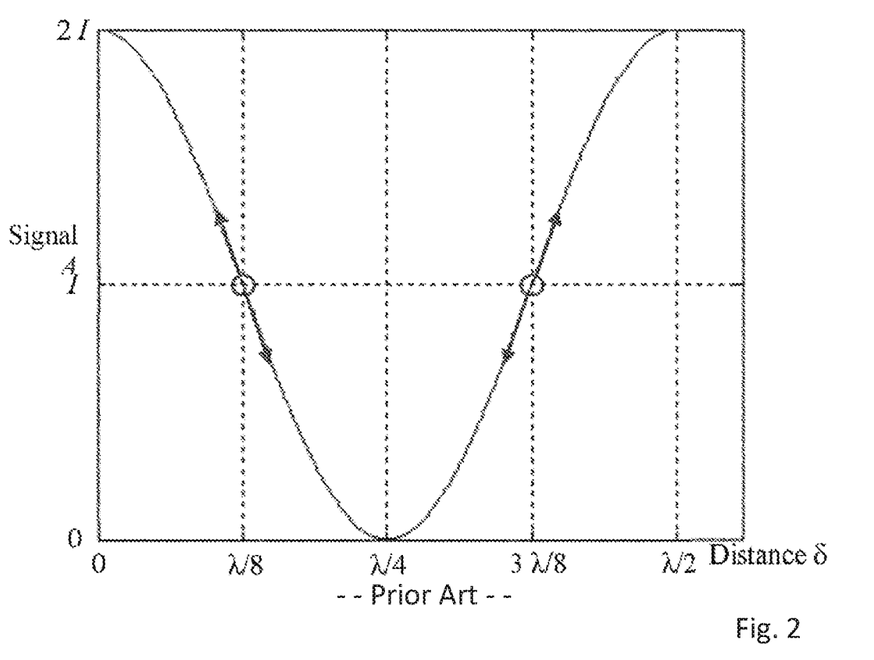

In US2005/0018541 an improvement is described where a diffractive structure with modulated diffraction efficiency is used for providing an optical sensor element for measuring of displacement, pressure, acoustic signals or the like without requiring complicated optics. This is achieved by using a grating with focusing capabilities so as to remove or reduce the need for complicated optics. This is explained below on the basis of Fresnel zone plates. A Fresnel zone plate is known to provide a flat lens based on diffraction. This structure is illustrated in FIG. 1. The presented solution does however have a dynamic range being limited to approximately $\lambda/8$, as shown in FIG. 2, which shows the signal generated by moving the reflective surface. The signal is periodic (only the first period is shown in the figure). The two first working points are shown by the two circles at $\lambda/8$ and $3\lambda/8$. The arrows shows the dynamic range of the sensor, where the generated signal is almost linear with the reflective surface position.

There are other types of position sensors producing sine or quasi-sine signals where the dynamic range is increased by combining several signals out-of-phase. Articles by Brown, David A., et al. "A symmetric 3×3 coupler based demodulator for fiber optic interferometric sensors." *SPIE, Fiber Optic and Laser Sensors IX* Vol. 1584 (1991) [1] and Reid, Greg J., and David A. Brown. "Multiplex architecture for 3×3 coupler based fiber optic sensors." *SPIE, Distributed and Multiplexed Fiber Optic Sensors RI*, Boston (1993) [2] discuss examples of fibre-based position sensors where it used 3 signals with 0, 120° and 240° phase shift to retrieve the position with a dynamic range of several wavelengths. It is also possible to use to signals in quadrature (90° phase offset), as described in Stowe, D., and Tsung-Yuan Hsu. "Demodulation of interferometric sensors using a fiber-optic passive quadrature demodulator." *Lightwave Technology, Journal of* 1.3 (1983): 519-523 [3].

This is also mentioned in Optical interferometric sensor US 2009/0268211, especially in the abstract and paragraphs [0013], [0016] and [0020].

Another example of the prior art is shown in U.S. Pat. No. 7,355,720, which seems to be limited to Fabry-Perot resonators, where the amount of reflected light is measured. Light that is not reflected is transmitted. This principle is different from the grating readout of our invention, where a change in cavity length modulates the diffraction efficiency of the grating—i.e. how much light is directed into the 0-order (specular reflection) and −1/+1-orders mainly. If the membrane is totally reflecting, no light is transmitted. The use of a totally reflecting membrane in a Fabry-Perot device would not work: there would not be any modulation of the reflected light with change in cavity length.

However patent U.S. Pat. No. 7,355,720 mentions the use of several signals to extend the dynamic range, but first those signals are generated by different wavelengths. Then section [0020] mentions the use of a stack of multiple optical cavities that can be interrogated by several signals, also using multiple sources of light it seems. The article by D. Shin and B Kim, "A laser interferometer encoder with two micromachined gratings generating phase shifted quadrature", Journal of Micromechanics and Microengineering. 21 (2011) 085039 illustrates an alternative displacement encoder using two different gratings with two different grating line periods. In this experiment, the signals from the two gratings are separated by the angle at which light is diffracted, which in turn is a function of the period of the grating lines. In order to separate the two signals, the device must be illuminated by collimated light (here a bulk HeNe laser with a condensing lens) and the photodetectors be placed relatively far away from the gratings (here 10 mm). The resulting measurement can be performed on a dynamic range of several times the illumination wavelength due to the two signals in quadrature, but the measurement will be influenced by variation in the laser intensity.

Thus it is an object of the present invention to provide a relatively simple and inexpensive displacement sensor having an increased dynamic range. It is also an object to provide a solution decreasing the effects of intensity variations in the light source. The objects of the invention are solved using a sensor according to the invention as described in the accompanying claims. The provided solution might also be integrated into a compact MEMS device, by using focusing diffractive patterns that focus light from a divergent light source (such as a VCSEL) onto different photodetectors, thus providing a compact and simple way of separating signals from the different diffraction patterns.

Signal processing is described is based on the abovementioned publications, especially US2005/0018541.

SUMMARY

This present invention may be described as an extension to the use of several diffractive elements. The diffractive elements may be placed under the same reflecting surface and their heights relative to the reflecting surface must at all time differ only by a height offset which is nearly constant (this nearly constant height offset is different for each diffractive element). The reflection or/and diffraction from the different diffractive elements is directed onto several detectors and generates signals with phase differences.

The principle may thus be described as follows

If each diffractive element directs light onto its own detector, giving an electric signal $$A_n \approx I\left(1 + \cos\left(\frac{4\pi}{\lambda}\delta + \varphi_n\right)\right),$$

with a phase offset $$\varphi_n = \frac{4\pi}{\lambda}d_n,$$

and where I is the illumination intensity, λ the wavelength of the illumination, $d_i$ the height (distance) of each diffractive element relative to the reflecting surface when at its idle position and δ is the displacement of the reflecting surface relative to its idle position. Further information about how the signal A is generated can be found in US2005/0018541.

The principle is thus to read several signals with different phase offsets and we call this method multiple phase readout. In special cases the method can be called differential readout (when taking the difference of two signals, typically with a 180° phase difference) or quadratic readout (when using two signals with a 90° phase difference).

The principle of combining several sinusoidal signals out of phase in order to make a measurement—and more or less directly to increase the dynamic range—has already been implemented in several devices, for example in optical position sensors EP2482040, US2005/0253052 and WO 2002/04895. Other applications might be interferometric distance measurement and TV-holography (a quick patent search did not return relevant results on these last applications). We want to restrict this invention to position sensors with a diffractive readout, i.e. when using a diffraction grating or a focusing diffractive lens.

In US2005/0018541 the implementation is described of a "differential microphone" where two diffractive elements with two different heights relatively to the reflecting surface give two signals $A_1$ and $A_2$ with a phase difference of 180°, as illustrated in FIG. 9 in the publication.

We then have:

$$\begin{cases} A_1 = I\left(1 + \cos\left(\frac{4\pi}{\lambda}\delta\right)\right) \\ A_2 = I\left(1 + \cos\left(\frac{4\pi}{\lambda}\delta + \pi\right)\right) = I\left(1 - \cos\left(\frac{4\pi}{\lambda}\delta\right)\right) \end{cases}.$$

It is possible to cancel the fluctuations in the illumination I by combining $A_1$ and $A_2$, and retrieving directly the displacement of the reflecting surface:

$$\delta = \frac{\lambda}{4\pi}\cos^{-1}\left(\frac{A_1 - A_2}{A_1 + A_2}\right).$$

Cancellation of the illumination fluctuations can also be implemented by measuring the light focused (in the $-1^{st}$ diffraction order) by the diffractive element and the light reflected ($0^{th}$ diffraction order) by the diffractive element, which produce two signals with a π phase difference. Using both the reflection and diffraction to cancel the illumination fluctuation was published in a presentation by Lacolle et al, "Micromachined Optical Microphone based on a modulated diffractive lens", $3^{rd}$ of the EOS Topical Meeting on Optical Microsystems (OµS '09),Capri, Sep. 27-30, 2009. Patent applications by Hall et al US2011/0194857 and US2011/0194711discuss the principle applied to a linear grating without focusing capabilities.

To achieve highest sensitivity and a nearly linear measurement, it is important that the reflecting surface's idle position or working point is situated where the curve giving $$A = I\left(1 + \cos\left(\frac{4\pi}{\lambda}\delta + \varphi\right)\right)$$

is steepest (for high sensitivity) and most linear to avoid distortion in the measured signal. The two first suitable working points are shown in the present FIG. 2.

The curve is actually periodic with a period of λ/2 in distance or 2π in phase. Therefore, to ensure high sensitivity and good linearity, φ must be close to π/2 plus a multiple integer of π. This means that the distance d between the diffractive element and the reflecting surface at its idle position must satisfy $$d = \frac{\lambda}{8} + m\frac{\lambda}{4}, \text{ with } m = 1, 2, 3 \ldots$$

Therefore, the distance d must be very accurately defined. However, in a physical implementation, it is possible that the height of the diffractive element relative to the reflecting surface at its idle position changes due to thermal stability of the device, combined with the fact that it could be very difficult to manufacture a device with a very accurate height in the first place. In this case we have a perturbation in the heights of the diffractive elements $d_{perturbation}$, which may or may not vary in time but which is the same for all diffractive elements.

In US2004/0130728 and US2005/0192976 a solution is proposed where the reflective surface is displaced by electrostatic actuation to a proper working point. This system requires an active feedback system.

Multiphase out can also be use as a remedy to this problem. We can for example fabricate a device with N diffractive elements where the height of the $n^{th}$ diffractive element is given by $$d_n = \frac{\lambda}{8} + m\frac{\lambda}{4} + n\frac{\lambda}{4N} + d_{perturbation},$$

in which case we are sure that there is a diffractive element satisfying $$\left|d_n - \frac{\lambda}{8} - m\frac{\lambda}{4}\right| \leq \frac{1}{2}\frac{\lambda}{4N}.$$

Choosing the diffractive element satisfying the condition above will ensure good sensitivity and linearity at all time. For example, if we have 4 diffractive elements, there will be a diffractive element with a working point that is within λ/32 of the closest ideal working point in height, or π/8 in phase.

Another new feature offered according to the present this invention is to increase the dynamic range of the sensor. This makes it possible to increase the dynamic range of the sensor from a ~$\lambda/8$ motion range to several $\lambda$.

This can be achieved by the fabrication of a sensor with two diffractive elements giving two signals in quadrature:

$$\begin{cases} A_1 = I\left(1 + \cos\left(\frac{4\pi}{\lambda}\delta\right)\right) \\ A_2 = I\left(1 + \cos\left(\frac{4\pi}{\lambda}\delta - \frac{\pi}{2}\right)\right) = I\left(1 + \sin\left(\frac{4\pi}{\lambda}\delta\right)\right) \end{cases}$$

The displacement $\delta$ is retrieved by first computing the complex number $$\left(\frac{A_1}{I} - 1\right) + i\left(\frac{A_2}{I} - 1\right) = \cos\left(\frac{4\pi}{\lambda}\delta\right) + i\sin\left(\frac{4\pi}{\lambda}\delta\right),$$

And then by unwrapping the phase of this complex number $$\delta = \frac{\lambda}{4\pi}\text{Unwrap}\left[\text{Arg}\left[\left(\frac{A_1}{I} - 1\right) + i\left(\frac{A_2}{I} - 1\right)\right]\right].$$

In this case the device does not require an accurate idle position (working point) and a small height variation $d_{perturbation}$ would not degrade the sensitivity or linearity of the device. Another advantage is that there is no theoretical limitation in the amplitude of the reflecting surface displacement that can be several $\lambda$. But this method requires that the illumination intensity I is known. This can be implemented in the same device by adding diffractive elements that gives signal with a 180° phase shift.

An alternative algorithm to retrieve the position on a dynamic range of several wavelengths from 2 signals in quadrature is described in Stowe, D., and Tsung-Yuan Hsu. "Demodulation of interferometric sensors using a fiber-optic passive quadrature demodulator." *Lightwave Technology, Journal of* 1.3 (1983): 519-523 [3].

In an implementation with multiple phase readout with four diffractive elements may be considered. Four diffractive elements give:

$$\begin{cases} A_1 = I\left(1 + \cos\left(\frac{4\pi}{\lambda}\delta\right)\right) \\ A_2 = I\left(1 + \cos\left(\frac{4\pi}{\lambda}\delta + \frac{\pi}{2}\right)\right) = I\left(1 - \sin\left(\frac{4\pi}{\lambda}\delta\right)\right) \\ A_3 = I\left(1 + \cos\left(\frac{4\pi}{\lambda}\delta + \pi\right)\right) = I\left(1 - \cos\left(\frac{4\pi}{\lambda}\delta\right)\right) \\ A_4 = I\left(1 + \cos\left(\frac{4\pi}{\lambda}\delta + \frac{3\pi}{2}\right)\right) = I\left(1 + \sin\left(\frac{4\pi}{\lambda}\delta\right)\right) \end{cases}$$

The displacement $\delta$ is retrieved by $$\delta = \frac{\lambda}{4\pi}\text{Unwrap}\left[\text{Arg}\left[\left(\frac{A_1 - A_3}{A_1 + A_3}\right) + i\left(\frac{A_4 - A_2}{A_2 + A_4}\right)\right]\right],$$

which is independent of the illumination intensity I.

This is a combination of the principles described above which gives all the three advantages of multiple phase read out:

Cancellation of the fluctuations of the illumination

Working point adjustment

Increased dynamic range

An alternative to the solution above the use of two diffractive elements gives two signals in quadrature, where both the diffracted and reflected signals from each of the two diffractive elements are measured. The diffracted and reflected signals are out of phase (with a 180° phase offset). This gives the four signals described above, with $$\varphi = 0, \frac{\pi}{2}, \pi, \frac{3\pi}{2},$$

but where I might be different for the diffracted and reflected signal, though only by a multiplicative factor, which can easily be corrected.

Both the illumination signal and the reflecting surface displacement can be retrieved by using three diffractive elements giving the signals $$\begin{cases} A_1 = I\left(1 + \cos\left(\frac{4\pi}{\lambda}\delta\right)\right) \\ A_2 = I\left(1 + \cos\left(\frac{4\pi}{\lambda}\delta - \frac{2\pi}{3}\right)\right). \\ A_3 = I\left(1 + \cos\left(\frac{4\pi}{\lambda}\delta + \frac{2\pi}{3}\right)\right) \end{cases}$$

We then compute the complex number $$S = A_1 + A_2\exp\left(i\frac{2\pi}{3}\right) + A_3\exp\left(-i\frac{2\pi}{3}\right).$$

After development we find $$S = I\frac{3}{2}\left[\cos\left(\frac{4\pi}{\lambda}\delta\right) + i\sin\left(\frac{4\pi}{\lambda}\delta\right)\right].$$

The signal illumination can easily be retrieved by computing the modulus of S:

$$I = \frac{2}{3}\text{Abs}(S),$$

And the reflective surface displacement can be retrieved by computing and unwrapping the phase of S:

$$\delta = \frac{\lambda}{4\pi}\text{Unwrap}[\text{Arg}(S)].$$

This also gives all three advantages of multiple phase readout:

Cancellation of the fluctuations of the illumination

Working point adjustment

Increased dynamic range

An alternative algorithm to retrieve the position on a dynamic range of several wavelengths from for 3 signals with 0, 120° and 240° phase shift is described in articles by Brown, David A., et al. "A symmetric 3×3 coupler based demodulator for fiber optic interferometric sensors." *SPIE, Fiber Optic and Laser Sensors IX* Vol. 1584 (1991) [1] and Reid, Greg J., and David A. Brown. "Multiplex architecture for 3×3 coupler based fiber optic sensors." *SPIE, Distributed and Multiplexed Fiber Optic Sensors RI*, Boston (1993) [2].

In a more general way three or more appropriate signals may be used where it is possible to retrieve I with:

$$I = \Sigma \alpha_i A_i$$

And retrieve the displacement with $$\delta = \frac{\lambda}{4\pi} \text{Unwrap}\left[\text{Arg}\left[\sum \beta_i \left(\frac{A_i}{I} - 1\right)\right]\right],$$

where $\alpha_i$ are real constants and $\beta_i$ are complex constants. Adding more signals adds redundancy to the measurement and might reduce measurement errors.

BRIEF DESCRIPTION OF THE DRAWINGS

The technical realizations of the invention will be described more in detail with reference to the accompanying drawings, illustrating the invention by way of examples, where FIGS. 1 and 2 illustrate the prior art.

DETAILED DESCRIPTION

Figure 3:
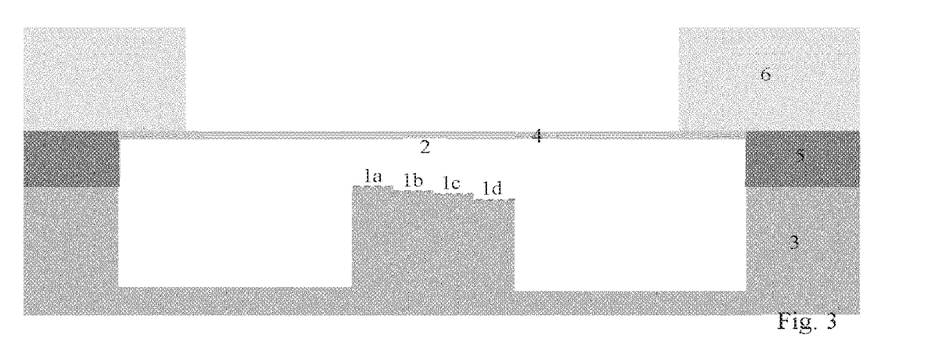
FIG. 3 illustrates a position sensor with multiple phase readout and here four diffractive elements.

A displacement sensor with multiple phase readout is shown in FIG. 3. The device consists of a surface (2) at least partially reflective, which might be the side of a membrane (4), and several diffractive elements (1*a-d*). The surface (2) and the diffractive elements (1*a-d*) are separated by a cavity defined by a spacer (5). In this embodiment there is a frame (6) supporting the membrane (4). The diffractive elements (1*a-d*) are supported by an at least partially transparent substrate (3). There can be 2 or more diffractive elements (on the figure there are 4). Different heights between (1*a-d*) and (2) are implemented by creating recesses in the substrate (3), where the diffractive elements (1*a-d*) are situated.

The diffractive elements (1*a-d*) are placed under the same reflecting surface (2) and their heights relative to the reflecting surface must at all time differ only by a height offset which is nearly constant (this nearly constant height offset is different for each diffractive element). This can be implemented as:

1. focusing diffractive lenses, such as in US2005/0018541, in which case the diffractive lenses have different optical axis, so that that they each focus the diffracted spot at different locations where the detectors can be situated,
2. non-focusing gratings such as in US2004/0130728 and US2006/0192976, in which case the diffraction from each grating element are split by the fact that the grating element are not situated at the same place, or/and have different orientation of the grating lines. It may also be possible to use additional lenses for focusing of the diffracted or reflected light onto several detectors.

The readout principle is the following: when the distance between the diffractive elements (1*a-d*) and the reflective surface (2) changes, the diffraction efficiency of the diffractive elements (1*a-d*) is modulated. Modulated signals can be generated by illuminating the device with a narrow-band light source (7), a VCSEL for example (see FIG. 4). Several photodetectors (8*a-d*) then measures the light reflected or diffracted by the diffractive elements. The signals have a similar dependence on the distance between the diffractive elements (1*a-d*) and the reflecting surface (2), but with a phase/height offset (an offset relative to the distance between the diffractive elements (1*a-d*) and the reflective surface (2)).

Figure 4:
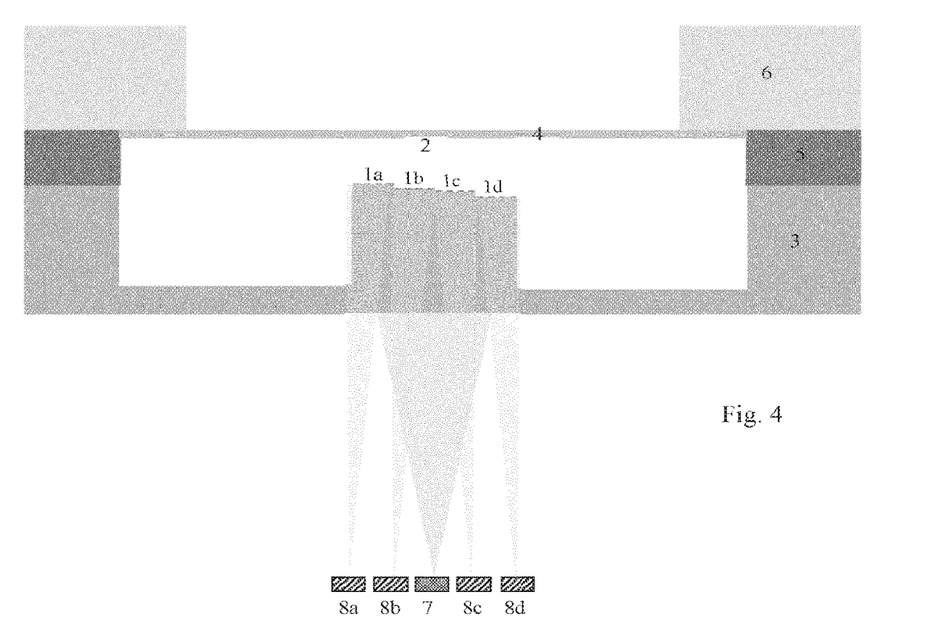
FIG. 4 Device according to one embodiment of the invention with light source and photodetectors.

The electric signals from the photodetectors are processed, so that the distance between the diffractive elements (1*a-d*) and the reflecting surface (2) is retrieved, on a dynamic range of several wavelengths. To achieve that, there must be two or more diffractive elements with a height offset.

Figure 5:
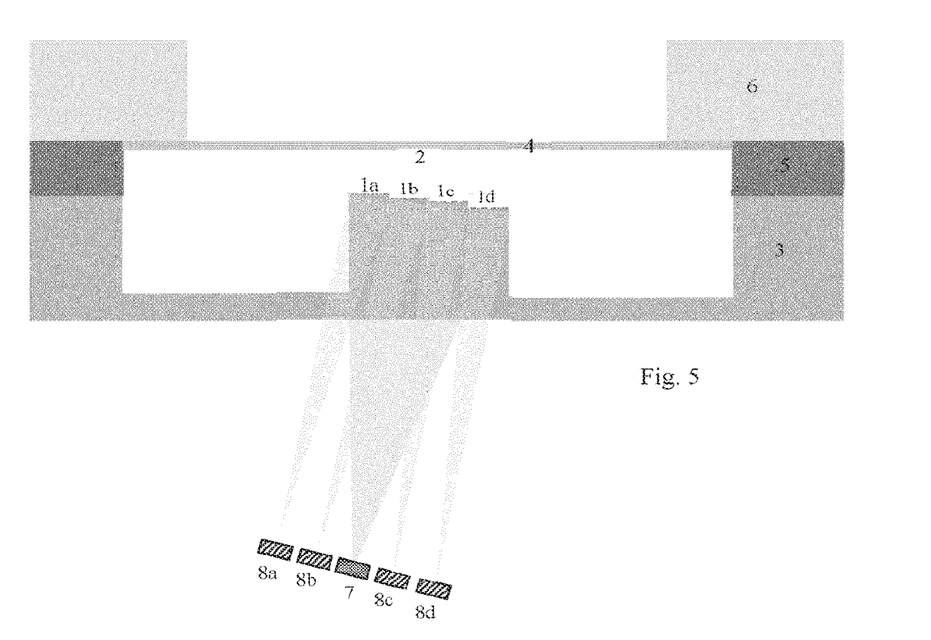
FIG. 5 Device according to another embodiment of the invention with light off-axis source and photodetectors.

A device similar to the one described above is shown in FIG. 5, were the light source is titled compared to the plane of the diffractive elements (1*a-d*) and of the reflecting surface (2), in order to reduce the amount of light reflected back to the light source. Light reflected back into a laser diode will typically increase the source noise.

As mentioned above, the heights of the diffractive elements relative to the reflecting surface must at all time differ only by a constant that is inherent to each diffractive element. In practice, this can be achieved by placing the diffractive elements closed to each other, under the reflective surface. In the case of a bending membrane, an appropriate location would be the centre of the membrane where its curvature is minimal. In FIG. 3, the diffractive elements are shown side by side, but the diffractive elements can rather be placed in a circular area under the reflecting surface. Two examples with three diffractive elements are shown in FIG. 6 and FIG. 7.

Figure 6A:
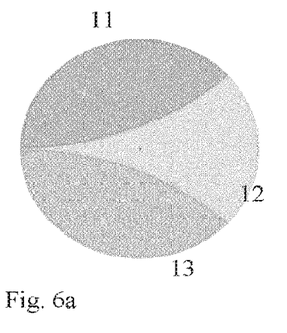
FIGS. 6*a-c* illustrates the embodiment of FIG. 5 with off-axis illumination and three different diffractive elements placed in a circular area under the reflecting surface.
Figure 6B:
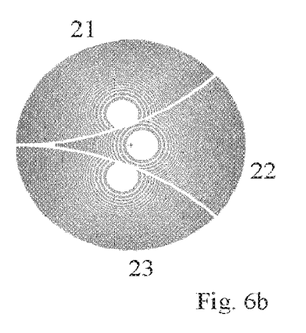
Figure 6C:
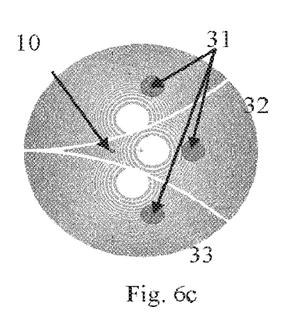

In FIG. 6*a-c* an Off-axis embodiment is shown with three different diffractive elements placed in a circular area under the reflecting surface. The position of the three different diffractive elements 11,12,13 is shown in FIG. 6*a*. In FIG. 6*b* shows an embodiment with focusing diffractive elements with centres 21,22,23, whose reflecting lines are shown. FIG. 6*c* shows, in addition, the position 10 of a light source for illumination of the diffractive elements, as well as the positions 31,32,33 of three detectors measuring light diffracted and focused by the three diffractive elements. The light source and the three detectors are placed in a plane situated under the diffractive elements, and the relative positions are chosen depending on the reflective characteristics of the lenses as well as their mutual positions.

The distribution of the three lenses over the circular area is chosen so as to provide essentially equal efficiency in reflections from all three diffractive elements.

Figure 7:
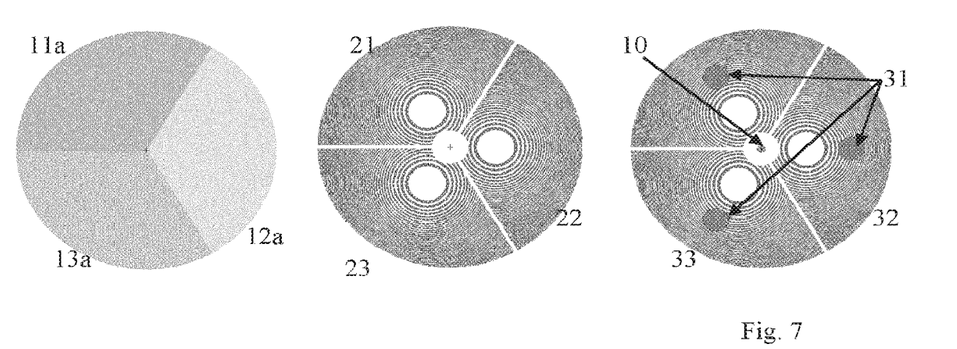
FIG. 7 Illustrate the embodiment in FIG. 4 with on-axis position of the light source.

FIG. 7 illustrates an On-axis embodiment similar to that shown in FIG. 6, but where the light source is placed in the centre and thus with three equally sized circle sections 11a, 12a, 13a each provided with diffractive elements. In the case of the use of focusing diffractive elements, it can be useful to make the centre areas 21,22,23 of the diffractive elements opaque 24, so that no light is reflected onto the detectors which in this case measure the diffracted and focused light. This can also be achieved by etching a curved surface 25 onto the substrate where the central part of each diffractive element is situated. In a similar way, it can be useful to make the area above the light source opaque or etched 20, in order to minimize the amount of light reflected back to the light source. This is shown in FIG. 8 and FIG. 9.

Figure 8:
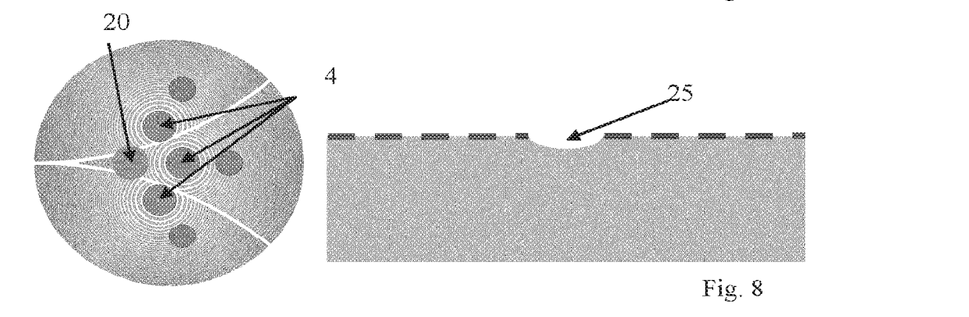
FIG. 8 illustrates a solution for reducing direct reflection off the gratings in the off-axis embodiment.

FIG. 8: Illustration of how the centre area of a focusing diffractive element can be made opaque or curved so that no light is reflected into the $0^{th}$ diffraction order from the centre area of the diffractive elements onto the detectors measuring the diffracted and focused light.

Figure 9:
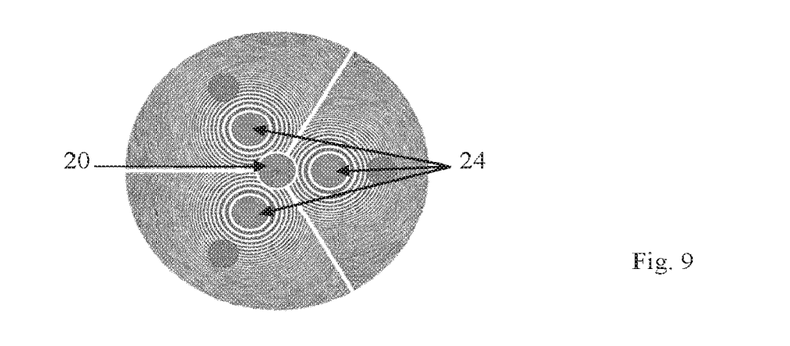
FIG. 9 illustrates a solution similar to FIG. 8 in the on-axis solution.

FIG. 9: Similar implementation as FIG. 8, but in an on-axis implementation.

Figure 10:
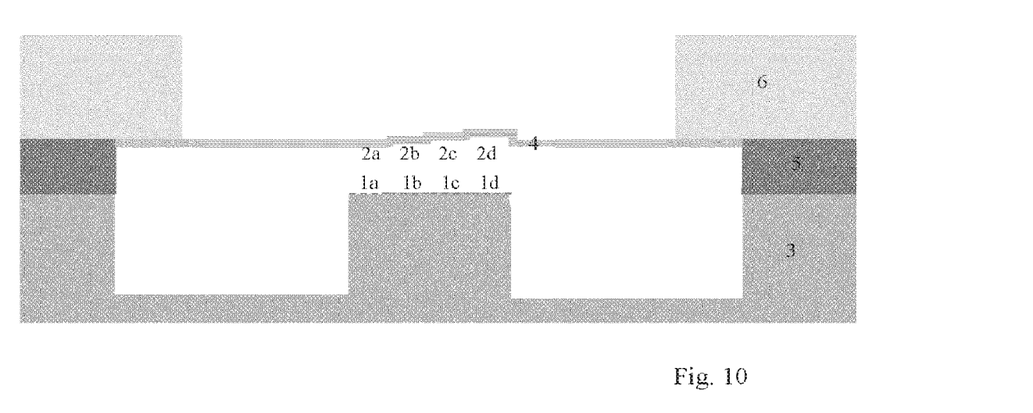
FIG. 10 illustrates an embodiment with the recesses implemented in the reflecting surface on the opposite side of the cavities from the diffractive elements.

Embodiment with recesses onto the reflecting surface. An alternative embodiment is to place the diffractive elements (1a-d) in plane and to implement the recesses (2a-d) in the reflecting surface, as shown in FIG. 10. There can be two or more diffractive elements.

Figure 11:
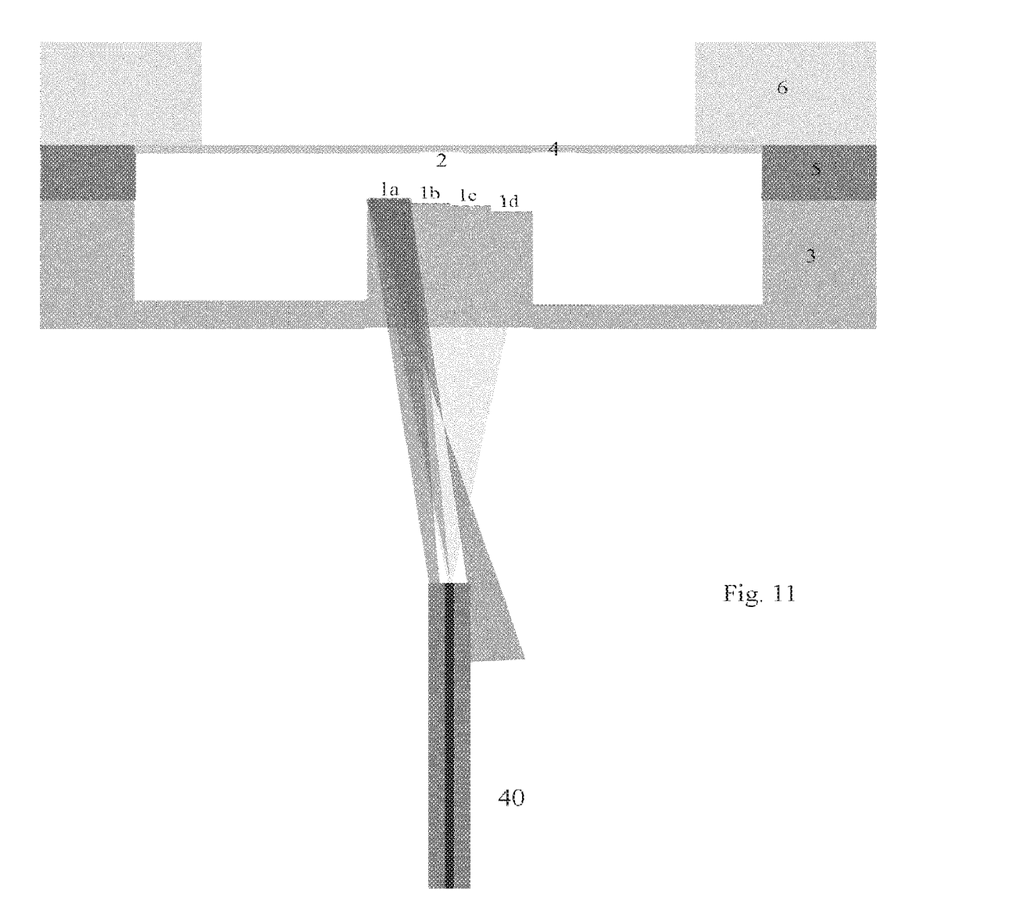
FIG. 11 illustrates an embodiment of the invention using an optical fiber for transmitting light and selecting light from the sensor.
Figure 12:
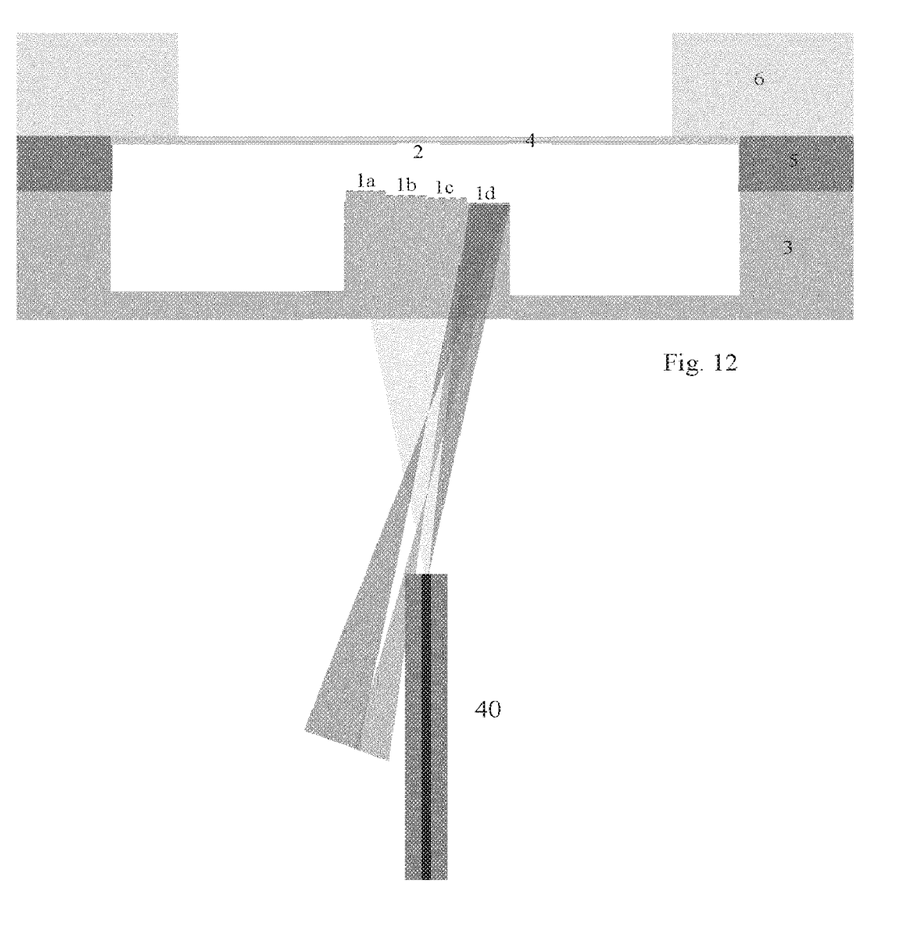
FIG. 12 illustrates the embodiment illustrated in FIG. 11, receiving a different wavelength back through the fibre.

In FIGS. 11 and 12 the light source and detectors are provided through an optical fibre 40 which, in a per se known way transmits light toward the diffractive elements 1(a-d). This light may have a chosen spectral range and the diffractive elements may be provided with focusing characteristics so as to focus light back toward the optical fibre så that the wavelength of the light received by the optical fibre indicates the identity of the focusing diffractive element. As the characteristics of the diffractive elements are known the position of the diffractive elements relative to the reflective surface 2 is known and the relative displacement may be found. This is shown in FIGS. 11-12 as the first diffractive element 1a focuses toward the fibre end in FIG. 11, while the fourth diffractive element focuses toward the fiber end in FIG. 12.

To summarize the invention thus relates to an optical displacement sensor comprising a first at least partially reflective surface and a second surface having at least two diffractive patterns, the patterns having different distances from the first surface and/or directing light at different wavelengths in predetermined directions. The diffractive patterns direct light into their different diffraction orders (including the $0^{th}$ diffraction order, i.e. reflection), and the intensity in some of the diffraction orders can be measured in order to generate different signals. This invention requires at least two signals generated by at least two diffraction patterns. The signals must have phase offsets that make it possible to relax the requirement that the distance between the two surfaces does not vary on a range larger than ca. $\lambda/8$. The signals might also make possible one or two of the following:
  increase the dynamic range of the sensor for ca. $\lambda/8$ to several $\lambda$,
  cancel the fluctuations in the illumination intensity.

US2005/0018541 describes the implementation of a "differential microphone", where two diffractive elements with two different heights generates two signals with 180° phase offset in order to cancel the fluctuation in the illumination intensity. But the two signals do not make possible the relaxation of the requirement that the distance between the two surfaces do not vary with more than ca. $\lambda/8$.

According to the preferred embodiment of the invention it relates to an optical displacement sensor comprising a first at least partially reflective surface and a second surface having at least two diffractive patterns, the surfaces being provided on elements having a variable distance between them, each pair constituting the partially reflective surface and diffractive pattern defining a cavity between them.

The sensor also comprises at least one light source transmitting light in at least one chosen wavelength range into said cavities and at least one light detector receiving light from the cavities, wherein each pair is adapted to provide a maximum diffractive efficiency at chosen wavelengths within said range, said diffractive patterns being adapted to direct light in at least one diffraction order toward at least one detector provided in a known position relative to said diffractive surfaces, the detector being adapted to measure the diffraction efficiency phase corresponding to each pair.

The height or cavity distance differences between the diffractive patterns and the chosen diffraction orders are chosen so that the generated signals on the light detectors have determined phase offsets relative to each other. The signals can then be processed in order to provide a measurement of the distance between the two surfaces that is independent of the light source intensity, and that has a high sensitivity and linearity over a range of operation longer than ca. ⅛ of the wavelength of the light source.

A first, preferred embodiment both being able to reduce the effects of the light intensity variations and provide a large dynamic range may comprise three diffraction patterns and three pairs having cavity lengths providing diffracted light measured having a phase offsets of 0°, 120° and 240°, respectively at the chosen wavelength.

Alternatively, the invention comprises two diffraction patterns and two pairs having cavity lengths. In this case the first diffractive pattern providing a phase offsets of 0° and 180°, respectively, between the diffracted and reflected signal from the first pattern. The second diffractive pattern is chosen so as to provide a phase offsets of 90° and 270° between the diffracted and reflected and at the chosen wavelength.

The sensor also comprising at least one light source transmitting light at least one chosen wavelength range into said cavities and at least one light detector is included for receiving light from the cavities.

The diffractive patterns are adapted to direct light toward at least one detector provided in a known position relative to said diffractive surfaces. Each cavity and diffractive pattern may also transmit light to several detectors, e.g. positioned in relation to the different diffraction orders of the pattern The diffractive patterns may be diffractive lenses focusing the light toward the respective sensors thus increasing the efficiency and sensitivity of the sensor.

The diffractive lenses may be constituted by circular patterns having an optical axis being shifted relative to the beam centre in the pattern plane, and may thus have a focal point shifted in the radial direction relative to the beam centre, where the detector or other light samplers such as optical fibres may be positioned.

The central area of each diffractive lens is provided with a surface treatment so as to avoid direct reflections from the light source to the detectors, thus securing that only light within the chosen wavelength range is focused toward the detectors. The surfaces may also be treated in other ways to avoid direct reflections back to the light source.

The difference in cavity lengths between the cavities may be chosen so as to provide a chosen phase differences between the light directed from said gratings.

The beam width of the light transmitted from the light source may be chosen so as to covering a certain area preferably being comparable to the area of the diffractive parts and cavities. Thus the cavities size across the beam cross section covering essentially equal area in the beam so that the cavities are subject to essentially the same amount of light. The shape of the cavities and diffractive patterns may also be chosen for this purpose.

According to one embodiment the light source is positioned coaxially with said reflecting areas, said cavities and detectors being distributed around said axis, wherein the cavities constitute equally sized sections around said axis.

Alternatively the light source may be positioned outside said axis, where the cavities cover essentially equal areas and essentially sections of the circumference relative to the distance from the centre of said centre. The shape of them being calculated so as to receive an equal amount of the light intensity.

The light source may be of any available type emitting in the chosen wavelength ranges, and may be transmitting toward the cavities through at least one optical fibre. According to one embodiment the source transmits light at several chosen wavelengths, where each diffractive pattern directing light at one of the chosen wavelengths toward one or several receiving optical fibres being connected to at least one detector.

The light source may also be chosen to illuminate the cavities through by an optical fibre transmitting light at several chosen wavelengths, where each diffractive pattern directing light back toward the same optical fibre being adapted to transmitting the signal to one or several detectors, for example through beam splitters etc.

Thus several options are possible, including no optical fibre, one fibre both in and out, one fiber for illumination and several for receiving and transmitting to the detectors, several in and several out, as well as several fibers in and one out, where e.g. the input signal is multiplexed. As mentioned above the same fiber or fibers may be used for input and output.

In addition a dispersive element may be employed between the illuminating fibre and the diffractive patterns directs different wavelengths to different diffractive patterns. Thus, instead of illuminating all the cavities with all the chosen wavelengths, it is possible to use a dispersive element between the fibre output and the cavities, so that each wavelength is directed to the corresponding cavity and back to the fibre(s).

Preferably the cavities define different cavity lengths, e.g. so as to increase the separation obtained by the wavelengths separated by the diffractive patterns.

The cavities may be illuminated with any chosen wavelength range or a number of ranges depending on the application and the available sources, diffractive patterns and detectors. All of the cavities may be illuminated with the complete ranges or the different wavelengths are selectively transmitted toward the different cavities, e.g. depending on the cavity length and pattern characteristics.

As discussed above the present invention provides means for obtaining a wide dynamic range covering movements between the reflective surfaces of the sensor ranging over several wavelengths of the light used for illuminating the surfaces and their related cavities and diffractive patterns.

This may, advantageously be used in microphones providing an increased dynamic range between small and large displacements between the surfaces while maintaining the sensitivity.

What is claimed is:

1. An optical displacement sensor comprising:
a first at least partially reflective surface and a second surface having at least three diffractive patterns, the first and second surfaces being provided on elements, wherein at least one of said elements is moveable to change a distance between the elements, so that the elements have a variable distance between them, wherein the partially reflective surface defines respective pairs together with each diffractive pattern, each of said pairs defining a respective cavity between them, each cavity having a respective optical cavity length;
at least one light source transmitting light in at least one chosen wavelength range into said cavities; and
at least one light detector receiving light from the cavities, wherein each pair is adapted to provide a maximum diffractive efficiency at chosen wavelengths within said range, said diffractive patterns being adapted to direct light toward at least one detector provided in a known position relative to said diffractive surfaces, the detector being adapted to measure the diffraction efficiency phase corresponding to each pair, thereby producing three or more signals which collectively allow measurement of a displacement between the first and second surfaces that is independent of an intensity of the light source;
wherein the respective optical cavity lengths between the pairs provide respective phase offsets.

2. The sensor according to claim 1, wherein the diffractive patterns comprise reflective lines deposited on an at least partially transparent substrate, the second surface being a surface of said at least partially transparent substrate.

3. The sensor according to claim 1, wherein the diffractive patterns are diffractive lenses focusing the light toward the respective sensors.

4. The sensor according to claim 3, wherein each diffractive lens is constituted by circular patterns having an optical axis being shifted relative to the beam centre.

5. The sensor according to claim 4, wherein a central area of each diffractive lens is provided with a surface treatment so as to avoid direct reflections from the light source to the detectors.

6. The sensor according to claim 1, wherein a difference in optical cavity lengths is chosen so as to provide a chosen phase differences between the light directed from said diffractive gratings.

7. The sensor according to claim 1, wherein the light source emits a light beam covering a certain area, the cavities size across the beam cross section covering essentially equal area in the beam, so as to be subject to essentially the same amount of light.

8. The sensor according to claim 1, wherein said surfaces are treated so as to avoid direct reflections back to the light source.

9. The sensor according to claim 1, wherein the light source is positioned coaxially with said reflective surfaces, said cavities and detectors being distributed around said axis.

10. The sensor according to claim 9, wherein said cavities constitute equally sized sections around said axis.

11. The sensor according to claim 9, wherein said light source is positioned outside said axis, said cavities covering essentially equal areas and essentially sections of the circumference relative to the distance from the centre of said centre.

12. The sensor according to claim 1, wherein said light source illuminates said cavities through an optical fibre transmitting light at several chosen wavelengths, and wherein each diffractive pattern directing light at one of the chosen wavelengths toward one or several optical fibres, which are transmitting the signal to one or several detectors.

13. The sensor according to claim 12, further comprising a dispersive element between the optical fibre and the diffractive patterns that directs different wavelengths to different diffractive patterns.

14. The sensor according to claim 1, wherein said light source illuminates said cavities through an optical fibre transmitting light at several chosen wavelengths, and wherein each diffractive pattern directing light back toward said optical fibre being adapted to transmit the signal to one or several detectors.

15. The sensor according to claim 14, further comprising a dispersive element between the optical fibre and the diffractive patterns that directs different wavelengths to different diffractive patterns.

16. The sensor according to claim 1, wherein the cavities define different cavity lengths.

17. The sensor according to claim 1, wherein the cavities are illuminated with light at different wavelengths.

18. A microphone comprising a sensor according to claim 1, wherein one of said surfaces is mounted on a membrane.

* * * * *